US012356069B1

(12) United States Patent
Lay et al.

(10) Patent No.: US 12,356,069 B1
(45) Date of Patent: Jul. 8, 2025

(54) MANAGING LOGICAL CAMERA DEVICES

(71) Applicant: Amazon Technologies, Inc., Seattle, WA (US)

(72) Inventors: Thomas Lay, Highland Park, IL (US); Lorne Joseph LaMeer, Burlington, WA (US); Tarun Reddy Karra, Leander, TX (US); Alice Zhang, Sunnyvale, CA (US); Hengzhi Chen, San Jose, CA (US); Choudhary Omer Rafique, Ewing Township, NJ (US)

(73) Assignee: Amazon Technologies, Inc., Seattle, WA (US)

( * ) Notice: Subject to any disclaimer, the term of this patent is extended or adjusted under 35 U.S.C. 154(b) by 173 days.

(21) Appl. No.: 17/361,899

(22) Filed: Jun. 29, 2021

(51) Int. Cl.
*H04N 23/661* (2023.01)
*H04N 23/611* (2023.01)

(52) U.S. Cl.
CPC ......... *H04N 23/661* (2023.01); *H04N 23/611* (2023.01)

(58) Field of Classification Search
CPC ............................ H04N 23/661; H04N 23/611
USPC .................................................... 348/207.11
See application file for complete search history.

(56) References Cited

U.S. PATENT DOCUMENTS

| | | | | |
|---|---|---|---|---|
| 8,352,949 B1* | 1/2013 | Kunath | ............... | H04L 65/1013 718/103 |
| 2004/0212687 A1* | 10/2004 | Patwari | ............ | H04M 1/72406 348/211.13 |
| 2008/0036871 A1* | 2/2008 | Ohmura | ............. | H04N 21/4223 348/222.1 |
| 2021/0176391 A1* | 6/2021 | Lim | ...................... | H04N 23/635 |
| 2021/0352206 A1* | 11/2021 | Chan | ................... | G06V 40/166 |
| 2022/0272255 A1* | 8/2022 | Xiong | ................. | H04N 23/695 |

\* cited by examiner

*Primary Examiner* — Lin Ye
*Assistant Examiner* — Chan T Nguyen
(74) *Attorney, Agent, or Firm* — Pierce Atwood LLP

(57) ABSTRACT

Techniques for managing logical camera devices are provided. A system for managing logical camera devices may instantiate logical camera devices having different responsibilities. A first logical camera device may receive and pass image data and metadata to a first application that may perform operations using both the image data and the metadata. A second logical camera device may receive and pass the metadata without the image data to a second application that may perform operations using the metadata but not the image data, thereby preserving power, memory, and/or processor resources that may have unnecessarily been used to provide the image data (e.g., via a buffer stream) to the second application, which may have deleted the image data upon receiving it. Another logical camera device may be instantiated to control other logical camera devices.

22 Claims, 9 Drawing Sheets

MANAGING LOGICAL CAMERA DEVICES

BACKGROUND

Computer vision may refer to the ability of computers to make determinations based on images or videos. For example, a computer may be trained to identify faces, humans, or objects based on image or video. A camera sensor may capture light corresponding to a face or a human and convert the captured light into electronic signals. The electronic signals may be processed into image data or video data such as video frames. The video frames may be used by a computer vision application to identify the face or the human.

BRIEF DESCRIPTION OF DRAWINGS

For a more complete understanding of the present disclosure, reference is now made to the following description taken in conjunction with the accompanying drawings.

DETAILED DESCRIPTION

Figure 1:
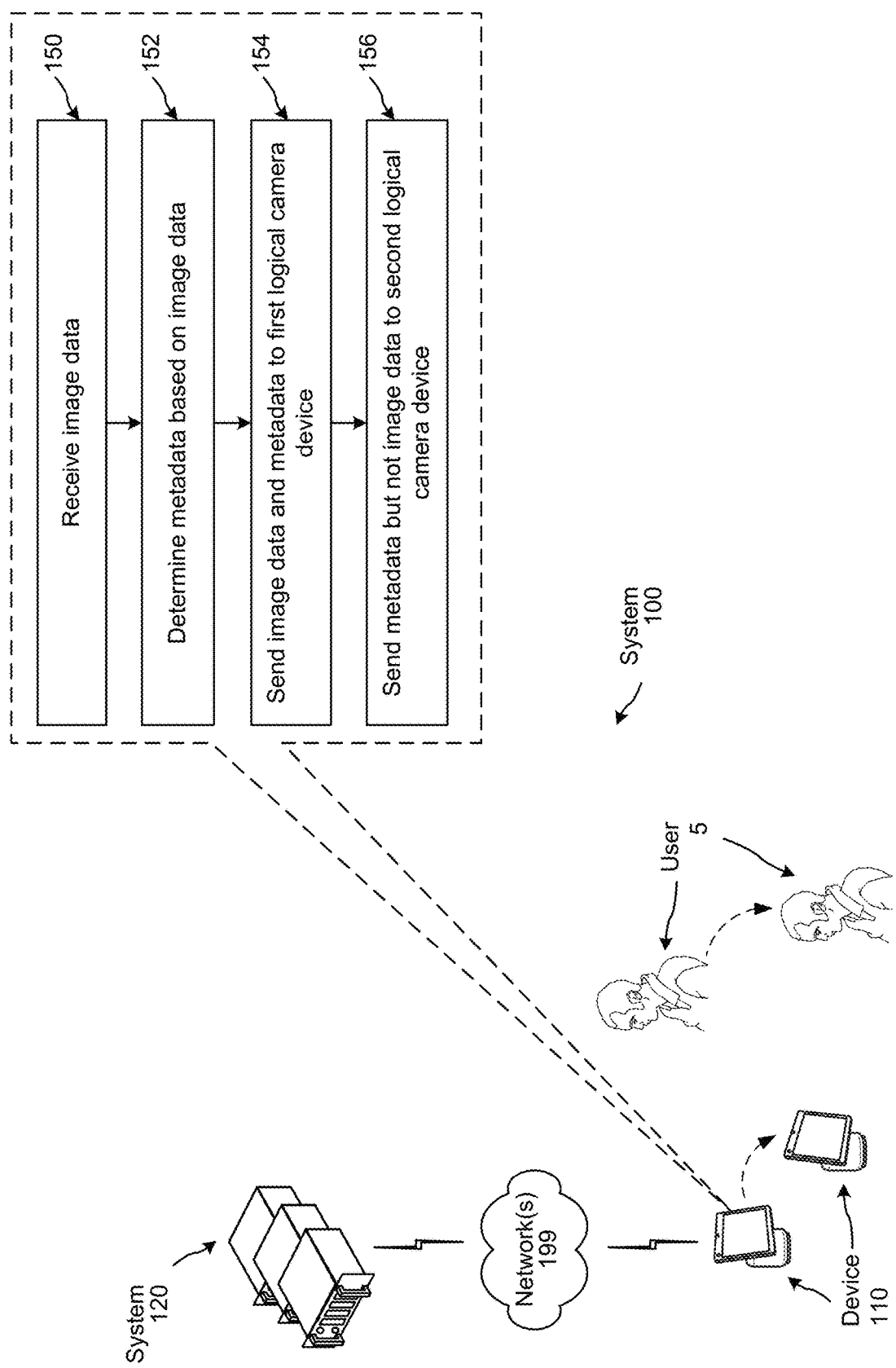
FIG. 1 is a conceptual diagram illustrating a system for managing logical camera devices, according to embodiments of the present disclosure.

Camera-enabled devices such as smartphones, tablets, laptops, or other smart devices may include computer vision services or applications. For example, the Amazon Echo Show may be a camera-enabled (and speech-enabled) device that includes computer vision services/operations to recognize faces or humans. In some devices, computer vision services may run simultaneously on the device with other applications such as camera-based applications. The term "camera-based application" may refer to any application that uses video data (e.g., frame data), metadata corresponding to the video data, or other data originating from or relying on a camera sensor, including but not limited to computer vision applications, photography applications, video conferencing applications, video call applications, video monitoring applications, video editing applications, camera controller applications, or the like. It may be possible for a particular application to be able to operate on metadata corresponding to image data without necessarily using the image data itself. For example, a particular application may operate in response to movement being detected. If metadata can indicate movement, the particular application may simply operate on the metadata without necessarily needing the underlying image data in order to detect the movement. Many such examples of such applications are possible. Further, multiple camera-based application applications may operate at least partially simultaneously or within a close time of each other and may have different requirements/operations needed from the underlying camera/camera manager in order to operate properly. In order for computer vision services to operate simultaneously with such applications, multiple video streams and related camera configurations may need to be exposed to the applications, which may be third party applications.

It should be noted that the terms "camera-enabled device" and "camera-based application" are used herein for illustrative purposes only and are not intended to limit the scope of the present disclosure. For example, the techniques and features described herein may be implemented with devices without cameras that may receive image/video data and related metadata from other devices or systems (e.g., via a network) to perform operations therewith. Further, the techniques and features described herein may be implemented with applications that do not use video data, metadata, or other camera related data.

Some interfaces may not support the ability for multiple applications to configure customized access from the same physical camera device. For example, the Android Operating System (OS) framework may allow for instantiation of a camera device class that may be a representation of a camera. In this framework, a physical device may feed a camera pipeline that is virtual and may not correspond directly to camera hardware. Components of the camera pipeline such as the camera device may be mapped to the camera hardware and allow for controlling of the camera hardware. For example, a camera device may be opened and outputs to an application such as a photo capture application or video recording application may be configured. Applications may make requests to the camera device but may always receive both image data and metadata.

Figure 2:
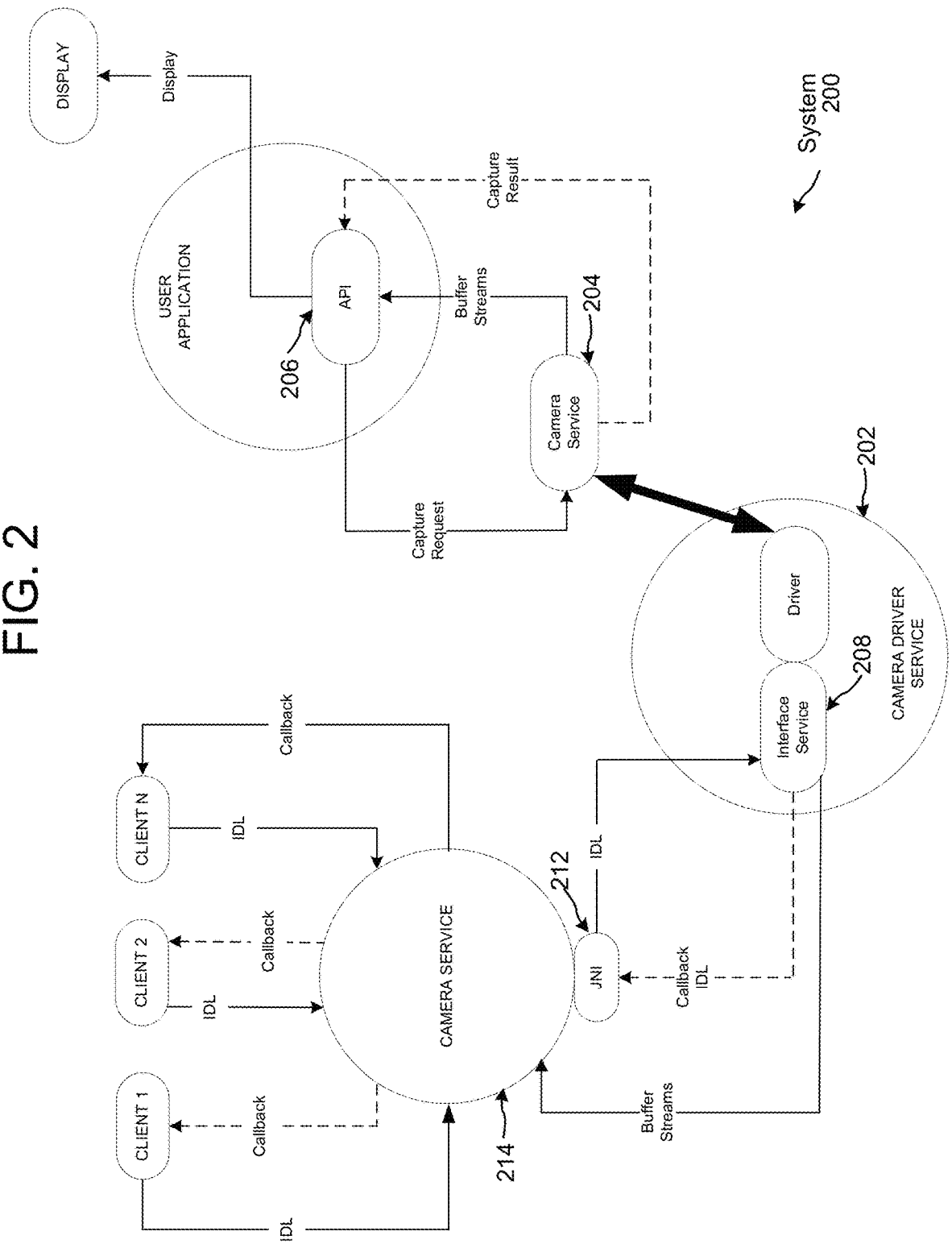
FIG. 2 is a schematic diagram of a conventional system to support multiple applications accessing a single physical camera device.

Referring to FIG. 2, a schematic diagram of a conventional system to support multiple applications accessing a single physical camera device is shown. A system 200 is implemented via the Android OS framework. The system 200 includes a camera driver service 202, a camera service 204, and an application programming interface (API) 206, all of which are part of a camera interface of a device operating system (e.g., Android). The camera interface allows applications (e.g., user application 216) to request and receive buffer streams of image data and metadata (via the camera driver service 202, the camera service 204, and the API 206) from the camera hardware. For other applications to receive the buffer streams of image data and metadata, a custom interface definition language (IDL)/camera driver interface is created. The custom IDL/camera driver interface includes an interface service 208, and Java native interface (JNI) 212. A camera service 214 may communicate with one or more clients (e.g., client 1, client 2 . . . client N) via another IDL. As shown, the system 200 may not allow multiple applications to configure customized access from the same physical camera device via the camera driver service 202, and both the user application and the clients (which may be part of a pipeline for other applications) may receive the buffer streams of image data and metadata.

The techniques and features described by the present disclosure may allow for implementation and use of a common API for multiple applications to control and access different streams from the same physical camera device using multiple logical camera devices.

Applications such as camera-based applications may use an interface provided by an operating system/architecture of a camera-enabled device to access a logical camera device configured with the camera-enabled device. As will be discussed in more detail below, a logical camera device may act as part of a pipeline and may receive requests for video data and metadata from a camera-based application. Further, as will be discussed in more detail below, a camera driver service may connect camera framework application programming interfaces (APIs) to camera hardware to control and receive video data from the camera hardware configured with the device.

The term "logical camera device" refers to an instantiation of a logical component that is capable of receiving video data (e.g., frame data) and/or metadata corresponding to the video data. A logical camera device may receive video data from camera hardware such as a camera sensor (e.g., a physical camera device). For example, a camera lens of the camera sensor may capture light and the camera sensor may send corresponding image data to the logical camera device. The image data may include data corresponding to the contents of multiple pixels that make up an entire image. The image data may be in a raw image format or, depending on device architecture and capabilities, in a more processed format such as JPEG (Joint Photographic Experts Group), TIFF (Tag Image File Format), etc. The image data may correspond to multiple images that make up video data. Multiple logical camera devices may receive the image/video data corresponding to the video captured by the camera sensor as well as metadata corresponding to the image/video data. One logical camera device may be configured to control one or more other logical camera devices. Additionally, one logical camera device may receive image/video data corresponding to video captured by multiple camera sensors (e.g., multiple physical camera devices) where the processing of the multiple camera sensors is combined, as well as metadata corresponding to the image/video data.

The term "physical camera device" refers to a device or system including camera hardware, a camera or image sensor, an optical component including one or more lenses, an image signal processor, and/or other physical camera components used to capture images. A physical camera device may be different than a logical camera device in that the physical camera device may include physical hardware components while the logical camera device may be instantiated using software.

The term "physical camera manager" may refer to a camera system service manager that is configured to detect and/or connect to and control logical camera devices. The physical camera manager may receive video data from the camera hardware or camera sensor (e.g., the physical camera device). The physical camera manager may be in communication with the physical camera device. The physical camera manager may manage multiple physical camera devices, which may include one or more universal serial bus (USB) camera devices and/or one or more network camera devices The term "camera driver service" may refer to an interface for camera hardware of a camera system. A camera driver service may allow an operating system of a camera-enabled device to generically implement camera hardware drivers and functionality. The camera driver service may connect camera APIs to camera hardware to control and receive video data from the camera hardware configured with the device. The physical camera manager may be in communication with the physical camera device via the camera driver service. The camera driver service may be similar to a hardware abstraction layer (HAL). In some embodiments, a typical camera driver may be implemented instead of a camera driver service and the techniques and features described herein may be implemented outside of a camera driver service or HAL.

It should be noted that the systems and devices described herein may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The systems and techniques can be implemented on a geographic basis to ensure compliance with laws in various jurisdictions and entities in which the components of the system and/or user are located.

Camera-based applications may need image/video data (e.g., frame data) and metadata corresponding to the video data to perform various operations. In some devices, in order for a camera-based application to receive video data and metadata, a logical camera device may need to be started or instantiated. The camera-based application may then receive all the data received by the logical camera device, which may include all the video data and metadata originating from the camera hardware of the device.

However, some camera-based applications may not need all the video data and metadata and/or may not need both the video data and the metadata. For example, some applications may only have a need for video data. Other applications may only have a need for metadata corresponding to the video data. Further, some applications may only have a need for a subset of the video data or the metadata (e.g., luminance such as lux) values, frame region of interest (ROI) values, etc.). Currently available applications or architectures (e.g., Android OS) may start or instantiate a logical camera device but receive both video data and metadata at the logical camera device when only metadata is needed. The requesting application may simply delete the video data once it is received. This approach may be inefficient and may consume unnecessary memory, power, and/or processing resources in providing the video data.

Further, some camera-based applications may need to control the camera hardware of the device, and may attempt to control the camera hardware through a logical camera device, or multiple logical camera devices. For example, a first application may monitor an ROI (via a first logical camera device) corresponding to a face in order to track the face as this may be a primary purpose of the first application. The first application may provide corresponding ROI data to a second application. The second application may use the ROI data to send commands to a second logical camera device which may set a preview ROI (e.g., cause a face to be centered by a physical camera device) for a third application. The primary purpose of the third application may be to display the video preview frames corresponding to the preview ROI (or cause the video preview frames to be displayed), and it may be desirable to use the ROI data from the first application to center the ROI within the video preview frames (e.g., via the second logical camera device) for the third application. Thus, the first application may send the ROI data to the second logical camera device to crop the ROI area for the video preview frames. The first application may not have control of the second logical camera device, but may control the cropping values for the video preview frames.

Figure 6:
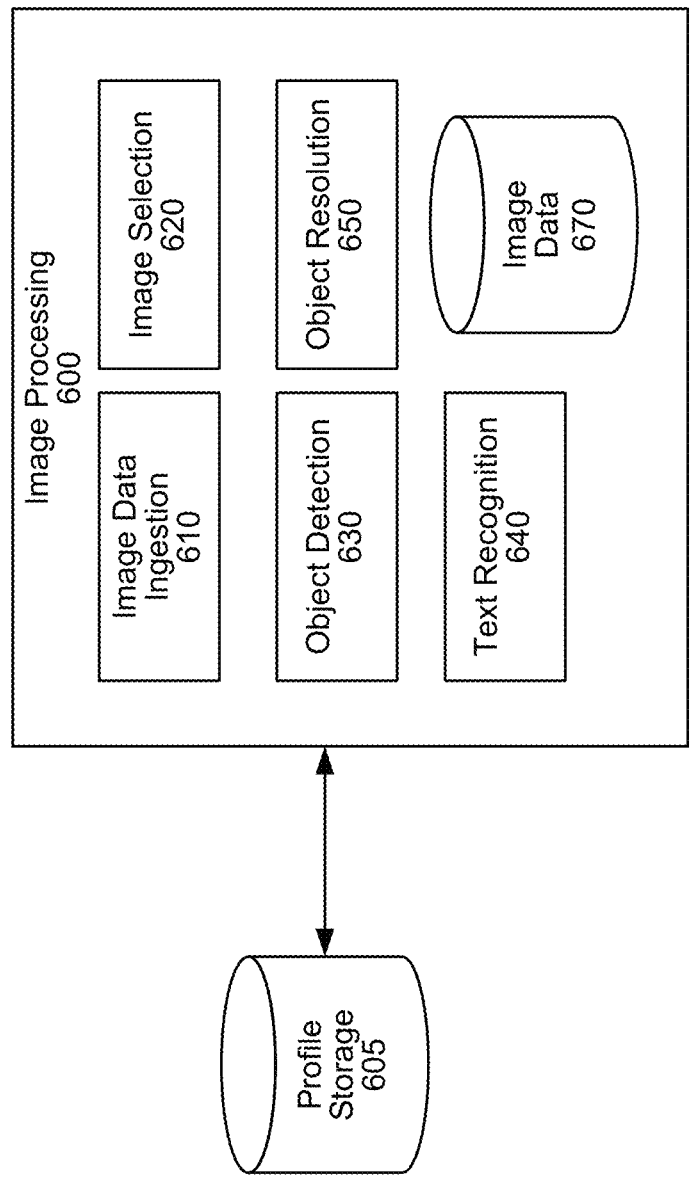
FIG. 6 is a conceptual diagram of components of an image processing component, according to embodiments of the present disclosure.

Referring now to FIG. 1, a conceptual diagram illustrating a system 100 for managing logical camera devices according to embodiments of the present disclosure is shown. A device 110 may be a camera-enabled device and include a physical camera device for capturing image and/or video data for processing. The image and/or video data may be processed locally by the device 110 or remotely by the system(s) 120. Examples of various devices 110 are further illustrated in FIG. 9. An image processing component 600 as shown in FIG. 6 may perform computer vision functions such as object recognition, modeling, reconstruction, etc. For example, the image processing component 600 may detect a person, face, etc. (which may then be used to perform certain other analysis). The image processing component 600 is described in greater detail below with regard to FIG. 6.

The system(s) 120 may be a remote system such as a group of computing components located geographically remote from the device 110 but accessible via network 199 (for example, servers accessible via the internet). The system(s) 120 may also include a remote system that is physically separate from device 110 but located geographically close to device 110 and accessible via network 199 (for example a home server located in a same residence as device 110). The system(s) 120 may also include some combination thereof, for example where certain components/operations are performed via a home server(s) and others are performed via a geographically remote server(s).

Figure 8:
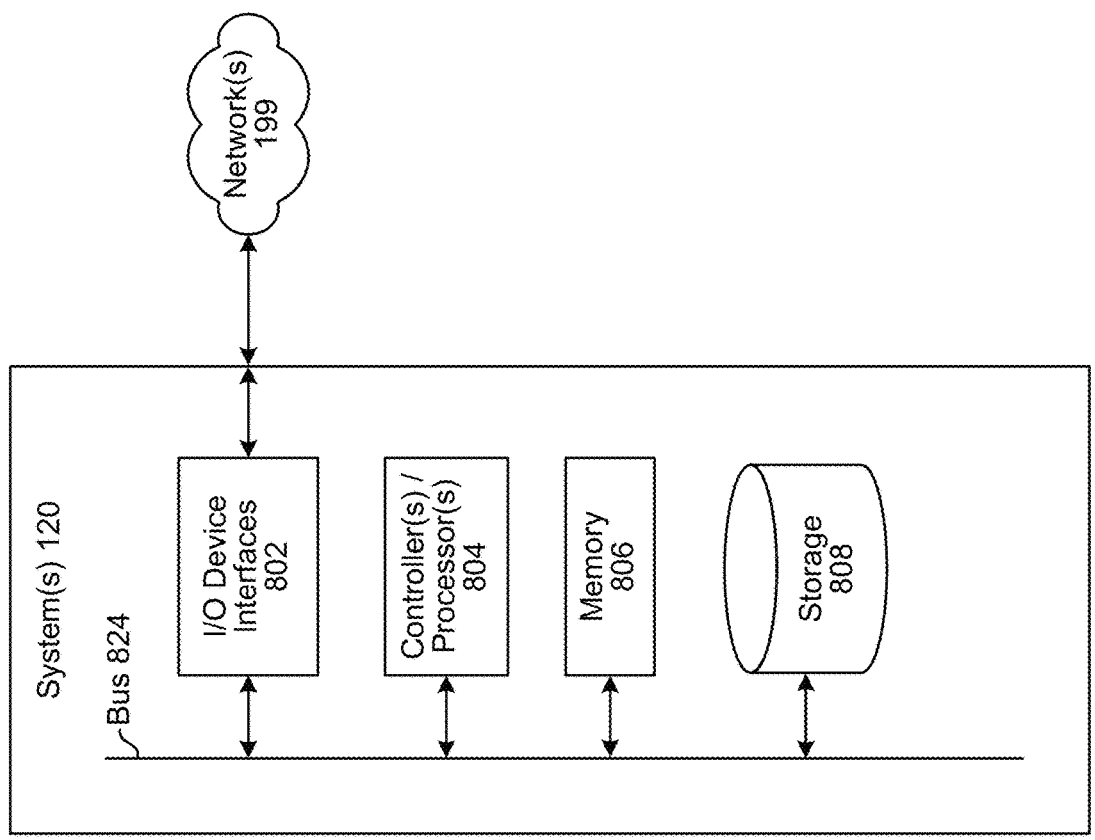
FIG. 8 is a block diagram conceptually illustrating example components of a system, according to embodiments of the present disclosure.

The system 100 may operate using various components as described in FIG. 8. The various components may be located on same or different physical devices. For example the components of system(s) 120 may be located on one or more remote device(s). Further, some or all of the components illustrated as part of system(s) 120 may be located on device 110 allowing the device to perform the operations of those components, depending on system configuration. Communication between various components may occur directly or across a network(s) 199.

The device 110 may include still image and/or video capture components such as a camera or cameras (e.g., physical camera devices) to capture one or more images. The device 110 may include circuitry for digitizing the images and/or video for transmission to the system(s) 120 as image data. For example, the device 110 may capture images using camera(s) 718 of the device 110 and generate image data representing those image(s). The image data may include raw image data or image data processed by the device 110. The device 110 may further include circuitry for voice command-based control of the camera, allowing a user 5 to request capture of image or video data. The device 110 may process the commands locally or send audio data representing the commands to the system(s) 120 for processing, after which the system(s) 120 may return output data that can cause the device 110 to engage its camera.

In some embodiments, the device 110 may include a display screen with a camera sensor mounted to the display screen. The display screen may be mounted on a motor. A camera system of the device 110 may use a computer vision service or application to look for a face or detect a human. A physical camera manager of the camera system may receive (150) video data (e.g., frame data). The video data may be received from camera hardware (e.g., a physical camera device) of the camera system which may include the camera sensor. A computer vision and/or machine learning framework (e.g., a machine learning component) of the camera system may process the video data and determine (152) metadata corresponding to the video data. The metadata may be determined based on the video data and a machine learning model. The metadata may include, for example, ROI data corresponding to the video data.

The camera system may find an ROI corresponding to a face or a human. For example, during a video call, a first application running on the device 110 may display video preview frames. The physical camera manager may send (154) video data (e.g., corresponding to the video preview frames) and corresponding metadata (e.g., ROI data) to a first logical camera device. The first application may receive the video data via the first logical camera device. The video preview frames may show a face of, for example, the user 5 participating in the video call. The physical camera manager may send (156) the metadata without the video data to a second logical camera device. The second logical camera device may provide a second application the metadata. In other words, the second logical camera device may send the ROI data to the second application to crop the ROI (e.g., the face of the user 5) for the video call. Thus, the second application may center and track the face of the user 5 on the video call.

For example, if the user 5 moves, the second application may track the face of the user 5 via the camera sensor and may move the display screen by controlling the motor in response to detecting or tracking movement of the face of the user 5. Thus, the operations performed by the camera system for the video call may use two or more logical camera devices. The first logical camera device may receive the frame data for the video preview frames and provide them to a first application which may perform ROI calculations and provide ROI data to a second application. The second application may use the ROI data to send commands to the second logical camera device may which may receive the ROI data to crop the video preview frames (e.g., by the physical camera device via the physical camera manager). The second logical camera device may receive the ROI data from the first logical camera device or the first application. A third application may receive the video preview frames (e.g., via a third logical camera device) and cause the video preview frames to be displayed.

Figure 3:
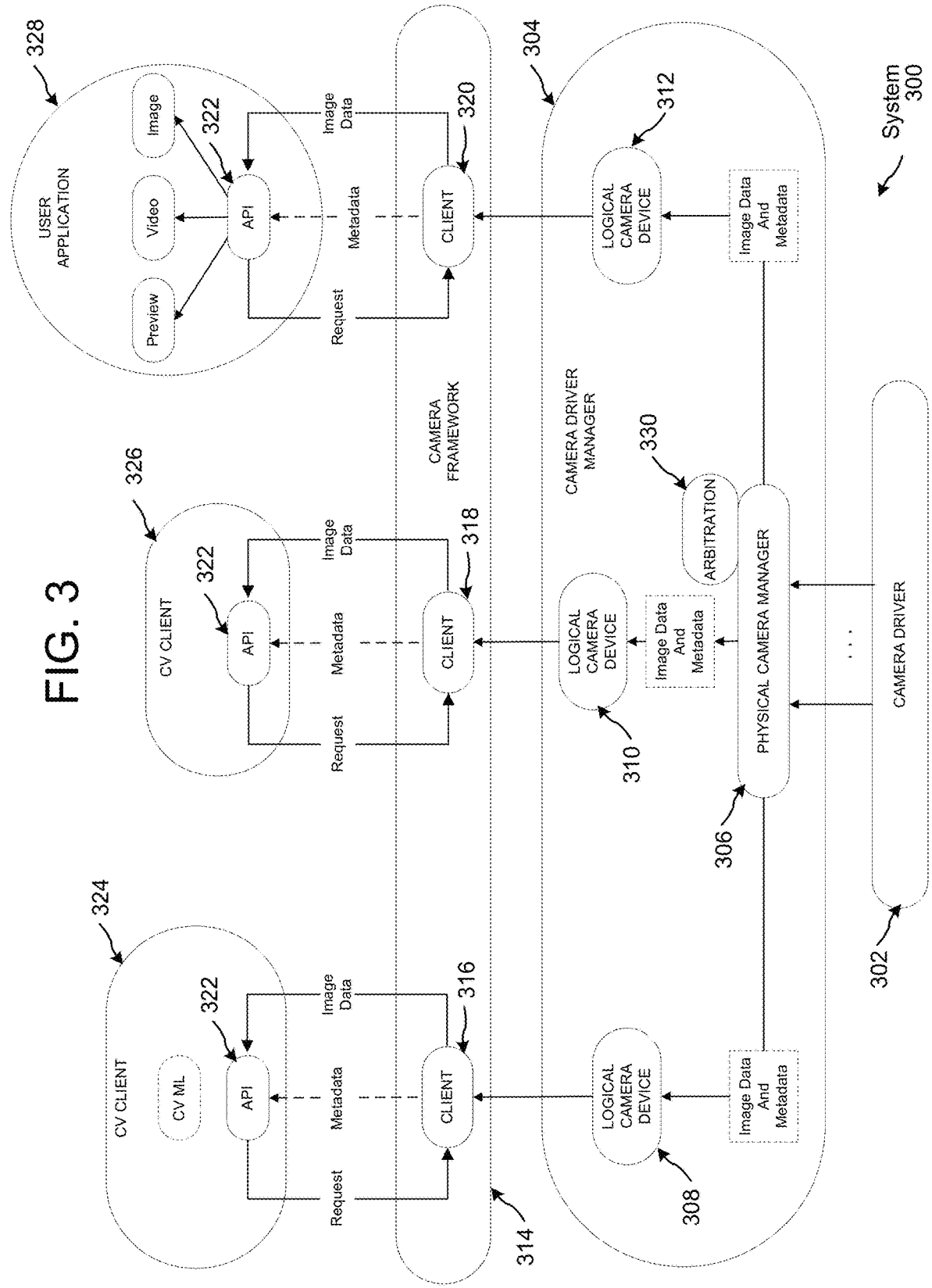
FIG. 3 is a schematic diagram of an illustrative architecture of a system for managing logical camera devices, according to embodiments of the present disclosure.

Referring now to FIG. 3, a schematic diagram of an illustrative architecture of a system 300 for managing logical camera devices according to embodiments of the present disclosure is shown. The system 300 may be implemented in a camera-enabled device such as the device 110. The system 300 may include a camera driver 302 and a camera driver manager 304. The camera driver manager 304 may instantiate and/or initialize classes and/or objects such a physical camera manager or logical camera devices. The camera driver manager 304 may include (e.g., instantiate) a physical camera manager 306, logical camera devices 308, 310, and 312, and arbitration component 330. The logical camera devices 308, 310, and 312 may receive video data and corresponding metadata from the physical camera manager 306. The system 300 may also include a camera framework 314. The camera framework 314 may include clients 316, 318, and 320, which may be referred to as camera clients.

One or more of the clients 316, 318, and 320 may communicate with a camera-based application or client via an API of an operating system of, for example, the device 110. For example, the client 316 may communicate with a computer vision (CV) client or application 324 via an API 322 to receive the video data and metadata and/or control camera hardware of the device 110. Further, the client 318 may communicate with a computer vision (CV client or application 326 via the API 322 to receive the video data and metadata and/or control camera hardware of the device 110. The CV clients or applications 324 or 326 may make determinations based on video data and/or corresponding metadata received such as, for example, identifying a face. Additionally, the client 320 may communicate with a user application 328 (e.g., a camera-based application) via the API 322 to receive the video data and metadata and/or control camera hardware of the device 110. The user application may display video preview frames or allow a user to capture video or images with the camera hardware of the device 110.

The API 322 may be a common API of an operating system of the device 110 accessible by the camera framework 314. The CV clients 324, 326 and/or the user application 328 may, via the API 322, make requests or commands from the clients 316, 318, and/or 320, respectively. The clients 316, 318, and/or 320 may send requests or commands to the logical camera devices 308, 310, and 312, respectively, and receive results (e.g., metadata) and/or image data (e.g., via buffer streams) from the logical camera devices 308, 310, and 312, respectively. Control data may also be sent with the metadata for sequencing purposes. The clients 316, 318, and/or 320 may send the results (e.g., metadata) and/or image data (e.g., via buffer streams) to the CV clients 324, 326, and/or the user application 328, respectively, via the API 322. As illustrated in CV client 324, a CV client may include a machine-learning (ML) model/component to perform CV operations as part of the CV client.

The arbitration component 330 may determine which parameters (e.g., an exposure value, a white balance value, an antibanding value, a focus distance value, a focus mode, a color effect value, an exposure value, and a zoom value,) of the camera hardware (e.g., the physical camera device) are affected or may be configured by the logical camera devices 308, 310, and 312. This is because the logical camera devices 308, 310, and 312 may be based on the same camera sensor (e.g., physical camera device). The arbitration component 330 may determine which capture request parameters are available for one or more of the logical camera devices 308, 310, and 312. In this way, the system 300 may allow sharing of one physical camera device (e.g., camera hardware and/or camera sensor of the device 110) to support multiple logical camera devices (e.g., logical camera devices 308, 310, and 312). The logical camera devices may allow multiple applications to control capture request parameters such as resolution, pixel format, crop, scale, etc. of video streams from the physical camera device. However, because the physical camera device is shared, it may be desirable to arbitrate between the applications when camera sensor level parameters are requested. For example, if one application changes an autoexposure parameter of the camera sensor, this setting may affect the camera sensor and therefore may affect the video streams passed to all of the logical camera devices associated with the camera sensor.

The arbitration component 330 may manage which application may control the camera sensor by allowing one application retain control of certain parameters. In other words, arbitration component 330 may override logical camera devices associated with other applications not holding control of those parameters. Further, in order to support digital panning, tracking, and zoom (DPTZ) controls, a controller logical camera device may be instantiated. The controller logical camera device may control video streams provided to other logical camera devices. Thus, the controller logical camera device may control one or more other logical camera devices.

Figure 4:
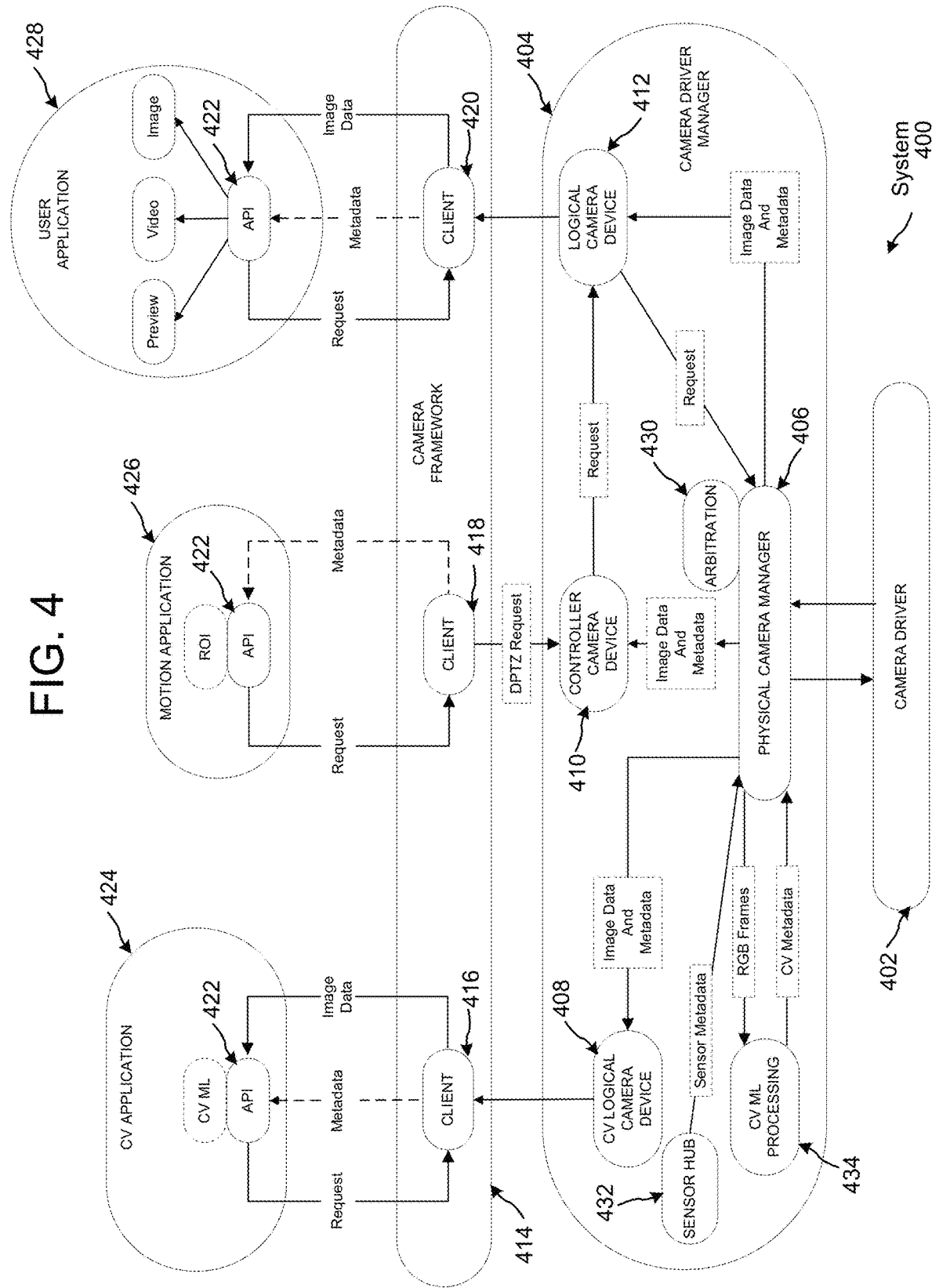
FIG. 4 is also a schematic diagram of an illustrative architecture of a system for managing logical camera devices, according to embodiments of the present disclosure.

The concept of the controller logical camera device is shown in FIG. 4. Referring to FIG. 4, a schematic diagram of an illustrative architecture of a system 400 for managing logical camera devices according to embodiments of the present disclosure is shown. The system 400 may be implemented in a camera-enabled device such as the device 110. The system 400 may include a camera driver 402 and a camera driver manager 404. The camera driver manager 404 may instantiate and/or initialize classes and/or objects such a physical camera manager or logical camera devices. The camera driver manager 404 may include (e.g., instantiate) a physical camera manager 406, a CV logical camera device 408, a controller logical camera device 410, a logical camera device 412, an arbitration component 430, a sensor hub 432, and a CV machine learning framework 434 (e.g., machine learning component) for image processing and analysis.

The sensor hub 432 may be in communication with other sensors of the device 110 such as a gyroscope, accelerometer, and/or magnetometer, and may allow for synchronization of data from one or more of these sensors with video data and/or metadata from the camera sensor. In some embodiments, the sensor hub 432 may provide metadata (e.g., motion data) associated with the gyroscope, accelerometer, and/or magnetometer to the physical camera manager which may be provided to CV application 424, motion application 426, and/or the user application 428. The sensor hub 432 may synchronize frame data with motion data to correlate differences with the motion data from the sensors. For example, the motion data may be used to map movement of a face and correlate the movement to pixel displacement for image stabilization.

The CV logical camera device 408, the controller logical camera device 410, and the logical camera device 412 may receive video data and corresponding metadata from the physical camera manager 406. The physical camera manager 406 may receive the video data (e.g., RGB frame data) from the camera sensor and pass the video data to the CV machine learning framework 434 for processing to generate CV metadata (e.g., based on the video data and a machine learning model). The CV machine learning framework 434 may then pass the CV metadata to the physical camera manager 406 which may pass the CV metadata (with the video data) to the CV logical camera device 408, the controller logical camera device 410, and the logical camera device 412.

The system 400 may also include a camera framework 414. The camera framework 414 may include clients 416, 418, and 420, which may be referred to as camera clients. One or more of the clients 416, 418, and 420 may communicate with a camera-based application via an API of an operating system of, for example, the device 110. For example, the client 416 may communicate with a CV application 424 via an API 422 to receive the video data and metadata. Further, the client 418 may communicate with a motion application 426 via the API 422 to receive the video data and metadata and/or control camera hardware of the device 110. The motion application 426 may control certain parameters of other logical cameras to provide DPTZ support and have permission that allows for limited and/or specific operation of the physical camera device. The CV application 424 may make determinations based on video data and/or corresponding metadata received such as, for example, identifying a face. Further, the motion application 426 may make ROI related calculations and determine ROI for motion tracking (e.g., of a face or user). Additionally, the client 420 may communicate with a user application 428 via the API 422 to receive the video data and metadata. The user application may display video preview frames or allow a user to capture video or images with the camera hardware of the device 110.

The CV application 424, motion application 426, and/or the user application 428 may, via the API 422, make requests or commands from the clients 416, 418, and/or 420, respectively. The clients 416, 418, and/or 420 may send the requests or commands to the CV logical camera device 408, the controller logical camera device 410, and the logical camera device 412, respectively, and receive results (e.g., metadata) and/or image data (e.g., via buffer streams) from the CV logical camera device 408, the controller logical camera device 410, and the logical camera device 412, respectively. Control data may also be sent with the metadata for sequencing purposes. The clients 416, 418, and/or 420 may send the results (e.g., metadata) and/or image data (e.g., via buffer streams) to the CV application 424, the monitoring application 426, and/or the user application 428, respectively, via the API 422.

The CV logical camera device 408 may be instantiated to provide video data and corresponding metadata to the client 416 for the CV application 424. The CV application 424 may include a CV machine learning component which may perform operations to facilitate computer vision capabilities for the CV application 424 and the device 110 (e.g., recognizing faces and/or identifying users). Further, the controller logical camera device 410 may be instantiated to control the camera hardware and/or the camera sensor, control one or more other logical camera devices, and/or provide corresponding metadata to the client 418 for the motion application 426. The controller logical camera device 410 may retain control of the camera hardware and/or camera sensor and may receive DPTZ requests from the motion application 426 and/or the client 418. In some implementations, the DPTZ requests may be passed to the logical camera device 412 which may pass the DPTZ requests to the physical camera manager to adjust the camera hardware and/or camera sensor accordingly. Thus, the controller logical camera device 410 may control other logical camera devices by passing commands to the other logical camera devices.

Figure 5:
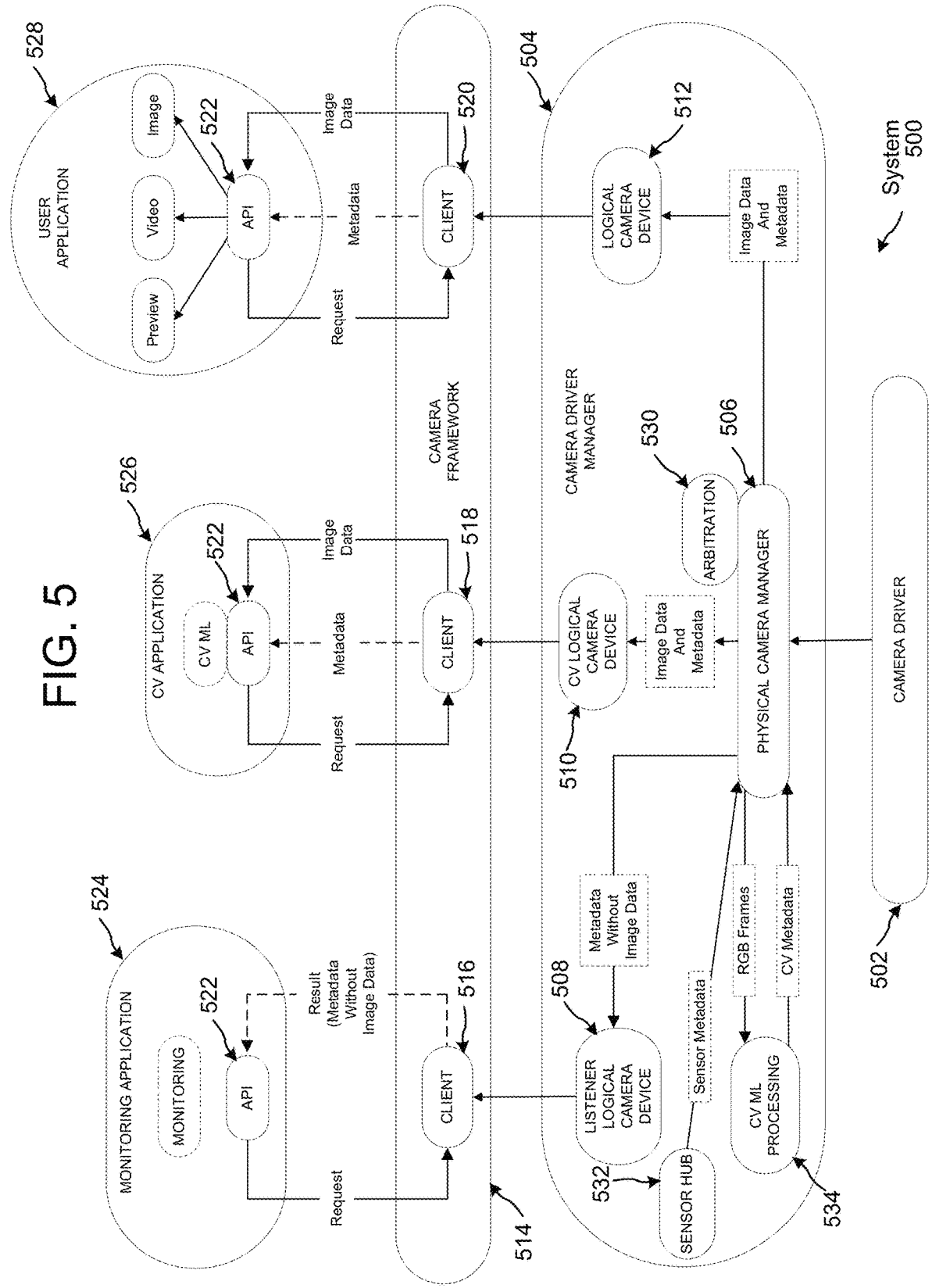
FIG. 5 is also a schematic diagram of an illustrative architecture of a system for managing logical camera devices, according to embodiments of the present disclosure.

Referring now to FIG. 5, a schematic diagram of an illustrative architecture of a system 500 for managing logical camera devices according to embodiments of the present disclosure is shown. The system 500 may be implemented in a camera-enabled device such as the device 110. The system 500 may include a camera driver 502 and a camera driver manager 504. The camera driver manager 504 may instantiate and/or initialize classes and/or objects such a physical camera manager or logical camera devices. The camera driver manager 504 may include (e.g., instantiate) a physical camera manager 506, a listener logical camera device 508, a CV logical camera device 510, a logical camera device 512, a sensor hub 532, and a CV machine learning framework 534 (e.g., a machine learning component) for image processing and analysis.

The sensor hub 532 may be in communication with other sensors of the device 110 such as a gyroscope, accelerometer, and/or magnetometer, and may allow for synchronization of data from one or more of these sensors with video data and/or metadata from the camera sensor. In some embodiments, the sensor hub 532 may provide metadata associated with the gyroscope, accelerometer, and/or magnetometer to the physical camera manager which may be provided to CV application 524, motion application 526, and/or the user application 528. The sensor hub 452 may synchronize frame data with motion data to correlate differences with the motion data from the sensors. For example, the motion data may be used to map movement of a face and correlate the movement to pixel displacement for image stabilization.

The listener logical camera device 508, the CV logical camera device 510, and the logical camera device 512 may receive video data and/or corresponding metadata from the physical camera manager 506. The physical camera manager 506 may receive the video data (e.g., RGB frame data) from the camera sensor (e.g. the physical camera device) and pass the video data to the CV machine learning framework 534 for processing to generate CV metadata or other metadata. The CV machine learning framework 534 may then pass the CV metadata or other metadata to the physical camera manager 506 which may pass the CV metadata with the video data to the CV logical camera device 510 and the logical camera device 512.

In some embodiments, the CV machine learning framework 534 may send the metadata without the video data to the listener logical camera device 508, which may pass the metadata without the video data to the client 516. This may occur in response to a request from the monitoring application 524 for the metadata, where the monitoring application 524 does not request the video data, or where the monitoring application 524 specifically requests not to receive the video data. This may be because the monitoring application performs operations for monitoring one or more parameters associated with the camera hardware or the camera sensor (e.g., a light level or lux) and does not need video or frame data. Thus, the system 500 would not need to allocate memory for a buffer stream to pass the video data through the system. In other words, the monitoring application may not need to the video data and may only need information (e.g., metadata) that the camera driver 502 or CV machine learning framework 534 has already determined. Additionally, the monitoring application 524 may be a third party application and it may not be desirable for users to allow the third parry application to access video frames. Thus, the techniques and features provided by the present disclosure may allow third party applications to access information (e.g., metadata) provided by the camera system but not access video frame data provided by the camera system. This may protect video belonging to users, thereby adding a level of privacy and security.

In this way, a subset of responsibilities may be configured for different instances of the logical camera devices. A subset of the video data and/or metadata may be provided by the listener logical camera device 508 without consuming extra memory or processing resources to handle video data. For example, if no camera-based applications operating at a certain time request the video data and the applications operating request only the metadata, the video data may not be passed to any of the logical camera devices and may stay in the CV machine learning framework 534, thus allowing substantial processing, power, and memory capacity to be saved by the device 110 and adding a level of privacy and security as described above.

The system 500 may also include a camera framework 514. The camera framework 514 may include clients 516, 518, and 520, which may be referred to as camera clients. One or more of the clients 516, 518, and 520 may communicate with a camera-based application via an API of an operating system of, for example, the device 110. For example, the client 516 may communicate with the monitoring application 524 via an API 522 to receive the metadata without the video data, as described above. Further, the client 518 may communicate with a CV application 526 via the API 522 to receive the video data and metadata. The CV application 526 may make determinations based on the video data and/or corresponding metadata received such as, for example, identifying a face. Further, the motion application 524 may make ROI or other monitoring related calculations and determine ROI for motion tracking (e.g., of a face or user). Additionally, the client 520 may communicate with a user application 528 via the API 522 to receive the video data and metadata. The user application may display video preview frames or allow a user to capture video or images with the camera hardware of the device 110.

The monitoring application 524, CV application 526, and/or the user application 528 may, via the API 522, make requests or commands from the clients 516, 518, and/or 520, respectively. The clients 516, 518, and/or 520 may send the requests or commands to the listener logical camera device 508, the CV logical camera device 510, and the logical camera device 512, respectively, and receive results (e.g., metadata) and/or image data (e.g., via buffer streams) (or metadata without the image data) from the listener logical camera device 508, the CV logical camera device 510, and the logical camera device 512, respectively. Control data may also be sent with the metadata for sequencing purposes. The clients 516, 518, and/or 520 may send the results (e.g., metadata) and/or image data (e.g., via buffer streams) (or the metadata without the image data) to the monitoring application 524, CV application 526, and/or the user application 528, respectively, via the API 522.

The listener logical camera device 508 may be instantiated to pass the metadata without the video data to the client 516 for the monitoring application 524. For example, the listener logical camera device 508 may be instantiated to provide the metadata without the video data to the client 516 for the monitoring application 524 to save processing and memory resources on the device 110. The CV application 526 may include a CV machine learning component which may perform operations to facilitate computer vision capabilities for the CV application 526 and the device 110 (e.g., recognizing faces and/or identifying users).

Thus, the techniques and features described by the present disclosure may be implemented in a camera-enabled device to reduce complexity in the camera system. For example, by passing metadata without video data to the listener logical camera device, data streams passed to the camera-based applications may be smaller such that power, processing, and memory resources of the camera-enabled device may be preserved. Further, a buffer stream for the video data may not be needed, which may preserve further power, processing, and memory resources. Additionally, by providing metadata data without video data to various applications, an extra layer of security may be achieved where certain applications that do not require the video data will not be unnecessarily exposed to the video data. In other words, such applications may be exposed to listener logical camera devices that receive the metadata without the video data but may not be exposed to logical camera devices (e.g., CV logical camera devices or controller logical camera devices) that receive both the video data and the metadata.

Further, the techniques and features described by the present disclosure may be implemented to facilitate scaling up instances of logical camera devices based on subsets of video data and/or metadata requested by camera-based applications or particular responsibilities desired for the logical camera devices (e.g., controlling the camera sensor). For example, separate logical camera devices may be created such that a first listener logical camera device receives one particular subset of the metadata available for a first camera-based application as needed, and a second listener logical camera device receives another particular subset of the metadata available for a second camera-based application as needed. Additionally, multiple controller logical camera devices may be created and not all camera-based applications running on the device 110 may have the ability to access the controller logical camera devices. Thus, one controller logical camera device may control preview frame data for a preview application and another controller logical camera device may blur the still images of captured frames. Multiple controller logical camera devices may be created such that each one may control only a subset of operations or controls, further providing security with respect to third party applications.

In some embodiments, the framework (e.g., camera framework 314, 414, and/or 514) may, through instantiated clients, serve as a gateway for controlling the data provided to the camera-based applications, which may be third party applications. A priority scheme or permission scheme may be implemented where only permitted applications may access, for example, the CV logical camera device or the listener logical camera device, or access to those logical camera devices may be prioritized. Trusted applications may be granted the ability to access a listener logical camera device, a CV logical device, or other logical camera devices, however third party applications or untrusted applications may not be exposed to certain logical camera devices such as those that may access video data. Even if third party applications or untrusted applications request such data or access to a logical camera device exposed to the video data, the third part application or untrusted application may not receive access to the video data and the camera server may act as a gateway to control the data available to those applications.

Referring to FIG. 6, the system(s) 120 or the device 110 may include image processing component 600. The image processing component 600 may be located across different physical and/or virtual machines but may also be included in the device 110. For example, the image processing component 600 and/or portions or functionality thereof, may be used by or be included in, for example, CV clients/applications 324, 326, 424, 526, motion application 426, and/or user applications 428, 528. The image processing component 600 may receive and analyze image data (which may include single images or a plurality of images such as in a video feed). The image processing component 600 may work with other components of the system 120 to perform various operations. For example the image processing component 600 may work with a user recognition component to assist with user recognition using image data. The image processing component 600 may also include or otherwise be associated with image data storage 670 which may store aspects of image data used by image processing component 600. The image data may be of different formats such as JPEG, GIF (Graphics Interchange Format), BMP (Bitmap Image File), MPEG (Moving Picture Experts Group), other image/video formats, and/or the like.

Image matching algorithms, such as those used by image processing component 600, may take advantage of the fact that an image of an object or scene contains a number of feature points. Feature points are specific points in an image which are robust to changes in image rotation, scale, viewpoint or lighting conditions. This means that these feature points will often be present in both the images to be compared, even if the two images differ. These feature points may also be known as "points of interest." Therefore, a first stage of the image matching algorithm may include finding these feature points in the image. An image pyramid may be constructed to determine the feature points of an image. An image pyramid is a scale-space representation of the image, e.g., it contains various pyramid images, each of which is a representation of the image at a particular scale. The scale-space representation enables the image matching algorithm to match images that differ in overall scale (such as images taken at different distances from an object). Pyramid images may be smoothed and downsampled versions of an original image.

To build a database of object images, with multiple objects per image, a number of different images of an object may be taken from different viewpoints. From those images, feature points may be extracted and pyramid images constructed. Multiple images from different points of view of each particular object may be taken and linked within the database (for example within a tree structure described below). The multiple images may correspond to different viewpoints of the object sufficient to identify the object from any later angle that may be included in a user's query image. For example, a shoe may look very different from a bottom view than from a top view than from a side view. For certain objects, this number of different image angles may be 6 (top, bottom, left side, right side, front, back), for other objects this may be more or less depending on various factors, including how many images should be taken to ensure the object may be recognized in an incoming query image. With different images of the object available, it is more likely that an incoming image from a user may be recognized by the system and the object identified, even if the user's incoming image is taken at a slightly different angle.

This process may be repeated for multiple objects. For large databases, such as an online shopping database where a user may submit an image of an object to be identified, this process may be repeated thousands, if not millions of times to construct a database of images and data for image matching. The database also may continually be updated and/or refined to account for a changing catalog of objects to be recognized.

When configuring the database, pyramid images, feature point data, and/or other information from the images or objects may be used to cluster features and build a tree of objects and images, where each node of the tree will keep lists of objects and corresponding features. The tree may be configured to group visually significant subsets of images/features to ease matching of submitted images for object detection. Data about objects to be recognized may be stored by the system in image data 670, profile storage 605, or other storage component.

Image selection component 620 may select desired images from input image data to use for image processing at runtime. For example, input image data may come from a series of sequential images, such as a video stream where each image is a frame of the video stream. These incoming images need to be sorted to determine which images will be selected for further object recognition processing as performing image processing on low quality images may result in an undesired user experience. To avoid such an undesirable user experience, the time to perform the complete recognition process, from first starting the video feed to delivering results to the user, should be as short as possible. As images in a video feed may come in rapid succession, the image processing component 600 may be configured to select or discard an image quickly so that the system can, in turn, quickly process the selected image and deliver results to a user. The image selection component 620 may select an image for object recognition by computing a metric/feature for each frame in the video feed and selecting an image for processing if the metric exceeds a certain threshold. The image selection component 620 may be located on a device 110, as part of system 120, or some combination thereof.

The metrics used to select an image may be general image quality metrics (focus, sharpness, motion, etc.) or may be customized image quality metrics. The metrics may be computed by software components or hardware components. For example, the metrics may be derived from output of device sensors such as a gyroscope, accelerometer, field sensors, inertial sensors, camera metadata, or other components. The metrics may thus be image based (such as a statistic derived from an image or taken from camera metadata like focal length or the like) or may be non-image based (for example, motion data derived from a gyroscope, accelerometer, GPS sensor, etc.). As images from the video feed are obtained by the system, the system, such as a device, may determine metric values for the image. One or more metrics may be determined for each image. To account for temporal fluctuation, the individual metrics for each respective image may be compared to the metric values for previous images in the image feed and thus a historical metric value for the image and the metric may be calculated. This historical metric may also be referred to as a historical metric value. The historical metric values may include representations of certain metric values for the image compared to the values for that metric for a group of different images in the same video feed. The historical metric(s) may be processed using a trained classifier model to select which images are suitable for later processing.

For example, if a particular image is to be measured using a focus metric, which is a numerical representation of the focus of the image, the focus metric may also be computed for the previous N frames to the particular image. N is a configurable number and may vary depending on system constraints such as latency, accuracy, etc. For example, N may be 30 image frames, representing, for example, one second of video at a video feed of 30 frames-per-second. A mean of the focus metrics for the previous N images may be computed, along with a standard deviation for the focus metric. For example, for an image number X+1 in a video feed sequence, the previous N images, may have various metric values associated with each of them. Various metrics such as focus, motion, and contrast are discussed, but others are possible. A value for each metric for each of the N images may be calculated, and then from those individual values, a mean value and standard deviation value may be calculated. The mean and standard deviation (STD) may then be used to calculate a normalized historical metric value, for example STD (metric)/MEAN (metric). Thus, the value of a historical focus metric at a particular image may be the STD divided by the mean for the focus metric for the previous N frames. For example, historical metrics (HIST) for focus, motion, and contrast may be expressed as:

$$HIST_{Focus} = \frac{STD_{Focus}}{MEAN_{Focus}}$$

$$HIST_{Motion} = \frac{STD_{Motion}}{MEAN_{Motion}}$$

$$HIST_{Contrast} = \frac{STD_{Contrast}}{MEAN_{Contrast}}$$

In one embodiment the historical metric may be further normalized by dividing the above historical metrics by the number of frames N, particularly in situations where there are small number of frames under consideration for the particular time window. The historical metrics may be recalculated with each new image frame that is received as part of the video feed. Thus each frame of an incoming video feed may have a different historical metric from the frame before. The metrics for a particular image of a video feed may be compared historical metrics to select a desirable image on which to perform image processing.

Image selection component 620 may perform various operations to identify potential locations in an image that may contain recognizable text. This process may be referred to as glyph region detection. A glyph is a text character that has yet to be recognized. If a glyph region is detected, various metrics may be calculated to assist the eventual optical character recognition (OCR) process. For example, the same metrics used for overall image selection may be re-used or recalculated for the specific glyph region. Thus, while the entire image may be of sufficiently high quality, the quality of the specific glyph region (i.e. focus, contrast, intensity, etc.) may be measured. If the glyph region is of poor quality, the image may be rejected for purposes of text recognition.

Image selection component 620 may generate a bounding box that bounds a line of text. The bounding box may bound the glyph region. Value(s) for image/region suitability metric(s) may be calculated for the portion of the image in the bounding box. Value(s) for the same metric(s) may also be calculated for the portion of the image outside the bounding box. The value(s) for inside the bounding box may then be compared to the value(s) outside the bounding box to make another determination on the suitability of the image. This determination may also use a classifier.

Additional features may be calculated for determining whether an image includes a text region of sufficient quality for further processing. The values of these features may also be processed using a classifier to determine whether the image contains true text character/glyphs or is otherwise suitable for recognition processing. To locally classify each candidate character location as a true text character/glyph location, a set of features that capture salient characteristics of the candidate location is extracted from the local pixel pattern. Such features may include aspect ratio (bounding box width/bounding box height), compactness ($4*\pi*$candidate glyph area/(perimeter)$^2$), solidity (candidate glyph area/bounding box area), stroke-width to width ratio (maximum stroke width/bounding box width), stroke-width to height ratio (maximum stroke width/bounding box height), convexity (convex hull perimeter/perimeter), raw compactness ($4*\pi*$(candidate glyph number of pixels)/(perimeter)$^2$), number of holes in candidate glyph, or other features. Other candidate region identification techniques may be used. For example, the system may use techniques involving maximally stable extremal regions (MSERs). Instead of MSERs (or in conjunction with MSERs), the candidate locations may be identified using histogram of oriented gradients (HoG) and Gabor features.

If an image is sufficiently high quality it may be selected by image selection 620 for sending to another component (e.g., from device to system 120) and/or for further processing, such as text recognition, object detection/resolution, etc.

The feature data calculated by image selection component 620 may be sent to other components such as text recognition component 640, objection detection component 630, object resolution component 650, etc. so that those components may use the feature data in their operations. Other preprocessing operations such as masking, binarization, etc. may be performed on image data prior to recognition/resolution operations.

Object detection component 630 may be configured to analyze image data to identify one or more objects represented in the image data. Various approaches can be used to attempt to recognize and identify objects, as well as to determine the types of those objects and applications or actions that correspond to those types of objects, as is known or used in the art. For example, various computer vision algorithms can be used to attempt to locate, recognize, and/or identify various types of objects in an image or video sequence. Computer vision algorithms can utilize various different approaches, as may include edge matching, edge detection, recognition by parts, gradient matching, histogram comparisons, interpretation trees, and the like.

The object detection component 630 may process at least a portion of the image data to determine feature data. The feature data is indicative of one or more features that are depicted in the image data. For example, the features may be face data, or other objects, for example as represented by stored data in profile storage 605. Other examples of features may include shapes of body parts or other such features that identify the presence of a human. Other examples of features may include edges of doors, shadows on the wall, texture on the walls, portions of artwork in the environment, and so forth to identify a space. The object detection component 630 may compare detected features to stored data (e.g., in profile storage 605, image data 670, or other storage) indicating how detected features may relate to known objects for purposes of object detection.

Various techniques may be used to determine the presence of features in image data. For example, one or more of a Canny detector, Sobel detector, difference of Gaussians, features from accelerated segment test (FAST) detector, scale-invariant feature transform (SIFT), speeded up robust features (SURF), color SIFT, local binary patterns (LBP), trained convolutional neural network, or other detection methodologies may be used to determine features in the image data. A feature that has been detected may have an associated descriptor that characterizes that feature. The descriptor may comprise a vector value in some implementations. For example, the descriptor may comprise data indicative of the feature with respect to many (e.g., 256) different dimensions.

One statistical algorithm that may be used for geometric matching of images is the Random Sample Consensus (RANSAC) algorithm, although other variants of RANSAC-like algorithms or other statistical algorithms may also be used. In RANSAC, a small set of putative correspondences is randomly sampled. Thereafter, a geometric transformation is generated using these sampled feature points. After generating the transformation, the putative correspondences that fit the model are determined. The putative correspondences that fit the model and are geometrically consistent and called "inliers." The inliers are pairs of feature points, one from each image, that may correspond to each other, where the pair fits the model within a certain comparison threshold for the visual (and other) contents of the feature points, and are geometrically consistent (as explained below relative to motion estimation). A total number of inliers may be determined. The above mentioned steps may be repeated until the number of repetitions/trials is greater than a predefined threshold or the number of inliers for the image is sufficiently high to determine an image as a match (for example the number of inliers exceeds a threshold). The RANSAC algorithm returns the model with the highest number of inliers corresponding to the model.

To further test pairs of putative corresponding feature points between images, after the putative correspondences are determined, a topological equivalence test may be performed on a subset of putative correspondences to avoid forming a physically invalid transformation. After the transformation is determined, an orientation consistency test may be performed. An offset point may be determined for the feature points in the subset of putative correspondences in one of the images. Each offset point is displaced from its corresponding feature point in the direction of the orientation of that feature point. The transformation is discarded based on orientation of the feature points obtained from the feature points in the subset of putative correspondences if any one of the images being matched and its offset point differs from an estimated orientation by a predefined limit. Subsequently, motion estimation may be performed using the subset of putative correspondences which satisfy the topological equivalence test.

Motion estimation (also called geometric verification) may determine the relative differences in position between corresponding pairs of putative corresponding feature points. A geometric relationship between putative corresponding feature points may determine where in one image (e.g., the image input to be matched) a particular point is found relative to that potentially same point in the putatively matching image (i.e., a database image). The geometric relationship between many putatively corresponding feature point pairs may also be determined, thus creating a potential map between putatively corresponding feature points across images. Then the geometric relationship of these points may be compared to determine if a sufficient number of points correspond (that is, if the geometric relationship between point pairs is within a certain threshold score for the geometric relationship), thus indicating that one image may represent the same real-world physical object, albeit from a different point of view. Thus, the motion estimation may determine that the object in one image is the same as the object in another image, only rotated by a certain angle or viewed from a different distance, etc.

The above processes of image comparing feature points and performing motion estimation across putative matching images may be performed multiple times for a particular query image to compare the query image to multiple potential matches among the stored database images. Dozens of comparisons may be performed before one (or more) satisfactory matches that exceed the relevant thresholds (for both matching feature points and motion estimation) may be found. The thresholds may also include a confidence threshold, which compares each potential matching image with a confidence score that may be based on the above processing. If the confidence score exceeds a certain high threshold, the system may stop processing additional candidate matches and simply select the high confidence match as the final match. Or if, the confidence score of an image is within a certain range, the system may keep the candidate image as a potential match while continuing to search other database images for potential matches. In certain situations, multiple database images may exceed the various matching/confidence thresholds and may be determined to be candidate matches. In this situation, a comparison of a weight or confidence score may be used to select the final match, or some combination of candidate matches may be used to return results. The system may continue attempting to match an image until a certain number of potential matches are identified, a certain confidence score is reached (either individually with a single potential match or among multiple matches), or some other search stop indicator is triggered. For example, a weight may be given to each object of a potential matching database image. That weight may incrementally increase if multiple query images (for example, multiple frames from the same image stream) are found to be matches with database images of a same object. If that weight exceeds a threshold, a search stop indicator may be triggered and the corresponding object selected as the match.

Once an object is detected by object detection component 630 the system may determine which object is actually seen using object resolution component 650. Thus one component, such as object detection component 630, may detect if an object is represented in an image while another component, object resolution component 650 may determine which object is actually represented. Although illustrated as separate components, the system may also be configured so that a single component may perform both object detection and object resolution.

For example, when a database image is selected as a match to the query image, the object in the query image may be determined to be the object in the matching database image. An object identifier associated with the database image (such as a product ID or other identifier) may be used to return results to a user, along the lines of "I see you holding object X" along with other information, such giving the user information about the object. If multiple potential matches are returned (such as when the system can't determine exactly what object is found or if multiple objects appear in the query image) the system may indicate to the user that multiple potential matching objects are found and may return information/options related to the multiple objects.

In another example, object detection component 630 may determine that a type of object is represented in image data and object resolution component 650 may then determine which specific object is represented. The object resolution component 650 may also make available specific data about a recognized object to further components so that further operations may be performed with regard to the resolved object.

Object detection component 630 may be configured to process image data to detect a representation of an approximately two-dimensional (2D) object (such as a piece of paper) or a three-dimensional (3D) object (such as a face). Such recognition may be based on available stored data (e.g., 605, 670, etc.) which in turn may have been provided through an image data ingestion process managed by image data ingestion component 610. Various techniques may be used to determine the presence of features in image data. For example, one or more of a Canny detector, Sobel detector, difference of Gaussians, features from accelerated segment test (FAST) detector, scale-invariant feature transform (SIFT), speeded up robust features (SURF), color SIFT, local binary patterns (LBP), trained convolutional neural network, or other detection methodologies may be used to determine features in the image data. A feature that has been detected may have an associated descriptor that characterizes that feature. The descriptor may comprise a vector value in some implementations. For example, the descriptor may comprise data indicative of the feature with respect to many (e.g., 256) different dimensions.

Figure 7:
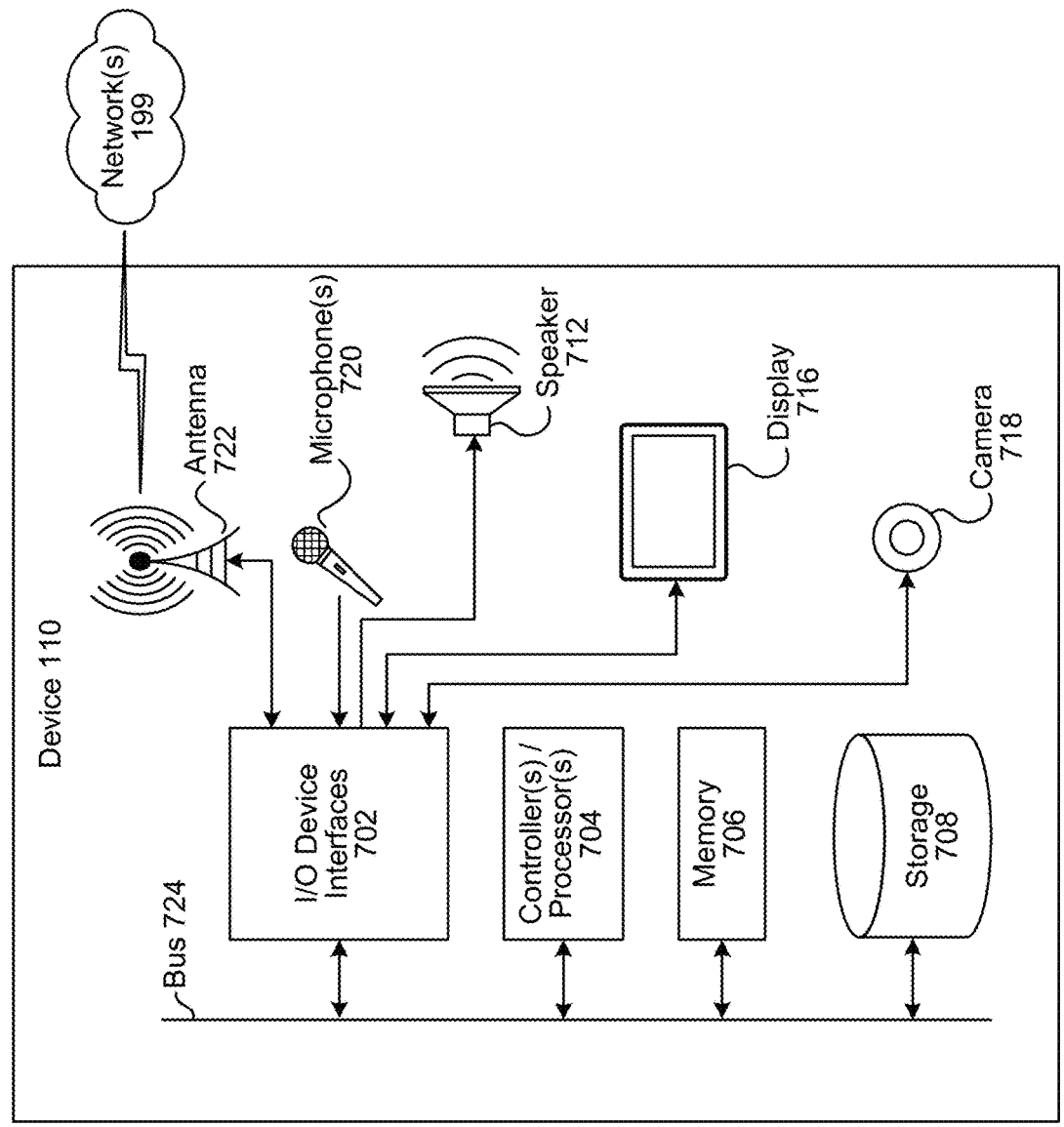
FIG. 7 is a block diagram conceptually illustrating example components of a device, according to embodiments of the present disclosure.

FIG. 7 is a block diagram conceptually illustrating a device 110 that may be used with the system. FIG. 8 is a block diagram conceptually illustrating example components of a system 120. The system may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems may be included in the overall system 100 of the present disclosure, such as one or more natural language processing systems 120 for performing ASR processing, one or more natural language processing systems 120 for performing NLU processing, one or more skill systems, etc. In operation, each of these systems may include computer-readable and computer-executable instructions that reside on the respective device, as will be discussed further below.

Each of these devices (110/120) may include one or more controllers/processors (704/804), which may each include a central processing unit (CPU) for processing data and computer-readable instructions, and a memory (706/806) for storing data and instructions of the respective device. The memories (706/806) may individually include volatile random access memory (RAM), non-volatile read only memory (ROM), non-volatile magnetoresistive memory (MRAM), and/or other types of memory. Each device (110/120) may also include a data storage component (708/808) for storing data and controller/processor-executable instructions. Each data storage component (708/808) may individually include one or more non-volatile storage types such as magnetic storage, optical storage, solid-state storage, etc. Each device (110/120) may also be connected to removable or external non-volatile memory and/or storage (such as a removable memory card, memory key drive, networked storage, etc.) through respective input/output device interfaces (702/802).

Computer instructions for operating each device (110/120) and its various components may be executed by the respective device's controller(s)/processor(s) (704/804), using the memory (706/806) as temporary "working" storage at runtime. A device's computer instructions may be stored in a non-transitory manner in non-volatile memory (706/806), storage (708/808), or an external device(s). Alternatively, some or all of the executable instructions may be embedded in hardware or firmware on the respective device in addition to or instead of software.

Each device (110/120) includes input/output device interfaces (702/802). A variety of components may be connected through the input/output device interfaces (702/802), as will be discussed further below. Additionally, each device (110/120/) may include an address/data bus (724/824) for conveying data among components of the respective device. Each component within a device (110/120) may also be directly connected to other components in addition to (or instead of) being connected to other components across the bus (724/824).

Referring to FIG. 7, the device 110 may include input/output device interfaces 702 that connect to a variety of components such as an audio output component such as a speaker 712, a wired headset or a wireless headset (not illustrated), or other component capable of outputting audio. The device 110 may also include an audio capture component. The audio capture component may be, for example, a microphone 720 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 716 for displaying content. The device 110 may further include a camera 718.

Via antenna(s) 722, the input/output device interfaces 702 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (702/802) may also include communication components that allow data to be exchanged between devices such as different physical servers in a collection of servers or other components.

The components of the device(s) 110 or system 120 may include their own dedicated processors, memory, and/or storage. Alternatively, one or more of the components of the device(s) 110 or the system 120 may utilize the I/O interfaces (702/802), processor(s) (704/804), memory (706/806), and/or storage (708/808) of the device(s) 110 or the system 120, respectively. Thus, an image processing component 600 may have its own I/O interface(s), processor(s), memory, and/or storage.

As noted above, multiple devices may be employed in a single system. In such a multi-device system, each of the devices may include different components for performing different aspects of the system's processing. The multiple devices may include overlapping components. The components of the device 110 or the system 120, as described herein, are illustrative, and may be located as a stand-alone device or may be included, in whole or in part, as a component of a larger device or system.

Figure 9:
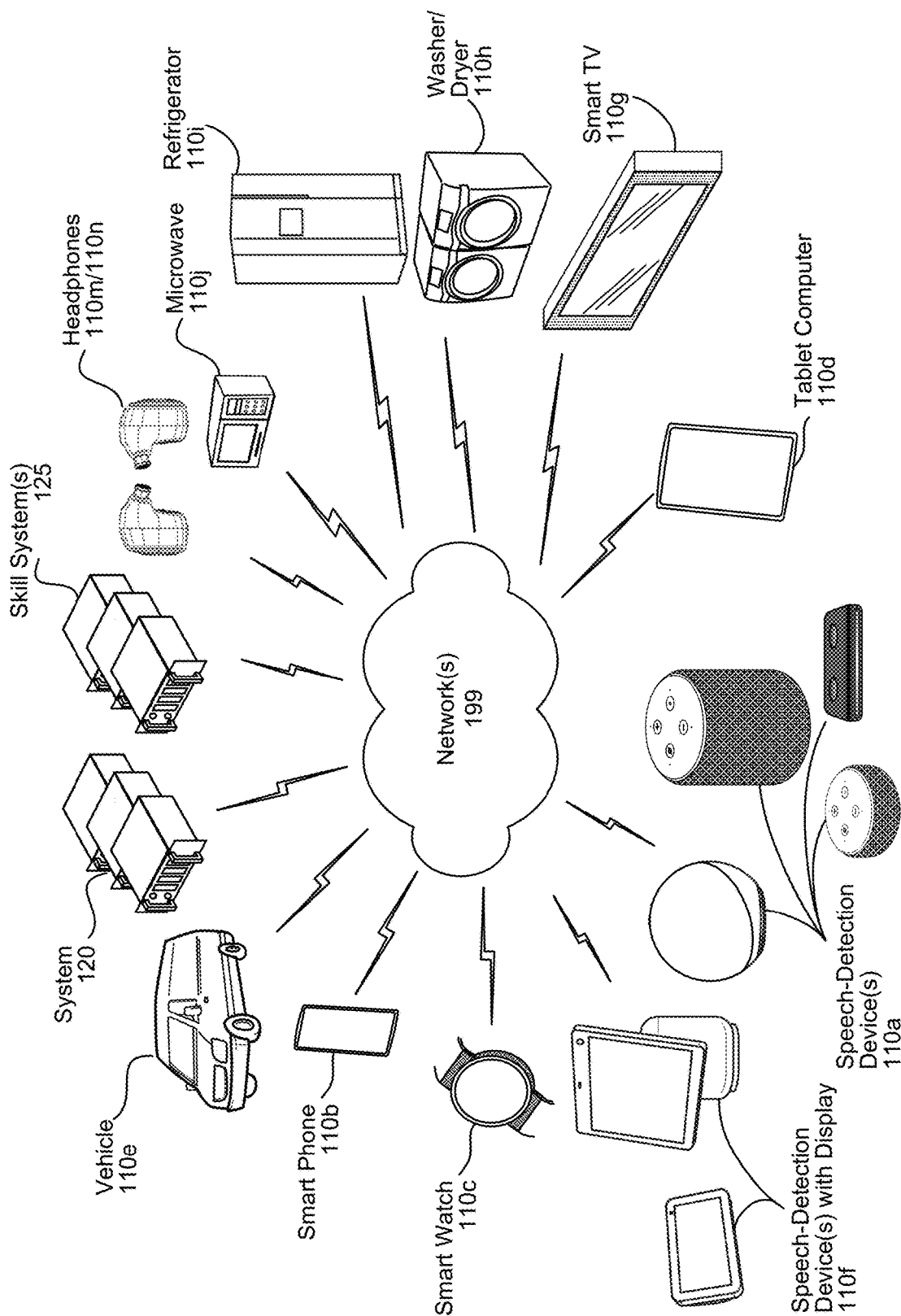
FIG. 9 illustrates an example of a computer network for use with the overall system, according to embodiments of the present disclosure.

As illustrated in FIG. 9, multiple devices (110a-110n, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a speech-detection device with display 110f, a display/smart television 110g, a washer/dryer 110h, a refrigerator 110i, a microwave 110j, etc. (e.g., a device such as a FireTV stick, Echo Auto or the like) may be connected to the network(s) 199 through a wireless service provider, over a WiFi or cellular network connection, or the like. Other devices are included as network-connected support devices, such as the system 120, the skill system(s) 125, and/or others. The support devices may connect to the network(s) 199 through a wired connection or wireless connection.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A system, comprising:
a physical camera device controlled by a physical camera manager in communication with the physical camera device;
a first logical camera device in communication with the physical camera manager, wherein the first logical camera device controls the physical camera device via the physical camera manager;
a first camera application in communication with the first logical camera device;
a second logical camera device in communication with the physical camera manager; and
a second camera application in communication, via the physical camera manager, with the first camera application, wherein the first camera application provides first data to the second camera application, via the physical camera manager to determine a command to set a preview parameter for the physical camera device.

2. The system of claim 1, further comprising:
a processor that determines metadata corresponding to image data based at least in part on the image data and a machine learning model, the image data received by the physical camera manager.

3. The system of claim 1, further comprising:
a motor controlled by the first camera application in communication with the first logical camera device, wherein control of the motor is based at least in part on detection of a face by the second camera application.

4. The system of claim 1, further comprising:
a component that determines the preview parameter of the physical camera device that is configurable by the first logical camera device and not configurable by the second logical camera device, wherein the component denies a request by the second logical camera device to configure the preview parameter.

5. The system of claim 4, wherein the component is an arbitration component.

6. The system of claim 1, wherein the physical camera manager provides, based at least in part on a request from the first camera application, metadata but not image data to the second logical camera device, wherein the metadata was determined based at least in part on the image data.

7. The system of claim 1, further comprising:
the second camera application that receives region of interest (ROI) data corresponding to a face from the first camera application, wherein the second camera application sends the command to the first logical camera device to set, via the physical camera manager and based at least in part on the ROI data, a preview ROI for the physical camera device; and
a third camera application that receives image data corresponding to the preview ROI and causes an image corresponding to the image data to be rendered.

8. The system of claim 1, wherein the first logical camera device and the second logical camera device are instantiated using software, and wherein the first logical camera device is configured to receive at least image data in multiple different formats.

9. A system, comprising:
a physical camera device;
a physical camera manager in communication with the physical camera device;
a first logical camera device in communication with the physical camera manager, wherein the physical camera manager sends image data, and metadata determined based at least in part on the image data, to the first logical camera device;
a first camera application in communication with the first logical camera device;
a second logical camera device in communication with the physical camera manager; and
a second camera application in communication, via the physical camera manager, with the first camera application, wherein the first camera application provides first data to the second camera application, via the physical camera manager to determine a command to set a preview parameter for the physical camera device.

10. The system of claim 9, further comprising:
a motor controlled by the first camera application in communication with the second logical camera device, wherein control of the motor is based at least in part on detection of a face by the first camera application.

11. The system of claim 9, further comprising:
a component that determines the preview parameter of the physical camera device that is configurable by the first logical camera device and not configurable by the second logical camera device, wherein the component denies a request by the second logical camera device to configure the preview parameter.

12. The system of claim 9, wherein the physical camera manager provides the metadata and the image data to the first logical camera device based on a first request from the first camera application for camera data that includes the metadata and the image data and provides the metadata but not the image data to the second logical camera device based on a second request from the second camera application for the metadata but not the image data.

13. The system of claim 9, wherein the first logical camera device controls the physical camera device via the physical camera manager and controls the second logical camera device, and wherein the second logical camera device is without control of the first logical camera device.

14. The system of claim 9, further comprising:
the second camera application that receives region of interest (ROI) data corresponding to a face from the first camera application, wherein the second camera application sends the command to the first logical camera device to set, via the physical camera manager and based at least in part on the ROI data, a preview ROI for the physical camera device; and
a third camera application that receives a first image data corresponding to the preview ROI and causes an image corresponding to the first image data to be rendered.

15. A method comprising:
receiving, by a physical camera manager, image data;
based at least in part on the image data and a machine learning model, determining metadata;
sending the image data and the metadata to a first logical camera device;
sending first data from a first camera application, via the physical camera manager, to a second camera application;
determining, based at least in part on the first data, by the second camera application a command to set a parameter corresponding to the metadata for a physical camera device; and
sending the metadata but not the image data to a second logical camera device.

16. The method of claim 15, further comprising:
receiving, from a first camera client, a first request for camera data including the image data and the metadata; and
receiving, from a second camera client, a second request for the metadata but not for the image data,
wherein sending the image data and the metadata to the first logical camera device is based at least in part on the first request, and
wherein sending the metadata but not the image data to the second logical camera device is based at least in part on the second request.

17. The method of claim 16, further comprising:
receiving, by the first camera client, the first request from a first application via an application programming interface (API);
receiving, by the second camera client, the second request from a second application via the API;
receiving, by the first application and from the first camera client, the image data and the metadata via the API; and
receiving, by the second application and from the second camera client, only the metadata via the API.

18. The method of claim 15, further comprising:
controlling a motor by the first camera application in communication with the second logical camera device, wherein control of the motor is based at least in part on detection of a face by the first camera application.

19. The method of claim 15, further comprising:
determining the parameter of the physical camera device that is configurable by the first logical camera device;
receiving, from a first application associated with the second logical camera device, a request to adjust the parameter; and
denying the request based at least in part on the parameter being configurable by the first logical camera device.

20. The method of claim 15, wherein sending the metadata but not the image data to the second logical camera device uses less of at least one of a processing resource, a memory resource, or a power resource of a first device than sending the metadata and the image data to the first logical camera device.

21. The method of claim 15, further comprising:
tracking a user based at least in part on the metadata but not the image data.

22. The method of claim 15, further comprising:
controlling, by the first logical camera device and via the physical camera manager, a physical camera device; and
controlling, by the first logical camera device, the second logical camera device, wherein the second logical camera device is without control of the first logical camera device.

\* \* \* \* \*